United States Patent [19]
Land

[11] 3,874,875
[45] Apr. 1, 1975

[54] PHOTOGRAPHIC FILM ASSEMBLAGE WITH RESILIENT PAD UNDER PROCESSING SOLUTION CONTAINER
[75] Inventor: Edwin H. Land, Cambridge, Mass.
[73] Assignee: Polaroid Corporation, Cambridge, Mass.
[22] Filed: June 11, 1973
[21] Appl. No.: 368,611

[52] U.S. Cl.............. 96/76 C, 354/86, 354/174, 354/304
[51] Int. Cl. ............ G03c 1/48, G03b 19/10
[58] Field of Search ...... 96/76 C; 354/86, 174, 304

[56] References Cited
UNITED STATES PATENTS
3,707,116  12/1972  Gold .................................. 96/76 C
3,732,099  5/1973  Chen .................................. 96/76 C Primary Examiner—Norman G. Torchin
Assistant Examiner—Richard L. Schilling
Attorney, Agent, or Firm—John S. Vale

[57] ABSTRACT

A photographic film assemblage comprising a film container; a plurality of "self-developing" film units, each including an integral container of fluid processing composition, arranged in stacked relation within the film container; a spring biased platen for urging the stack of film units towards a predetermined position within the film container; and a resilient pad located between the platen and the container of fluid of the last film unit in the stack.

21 Claims, 4 Drawing Figures

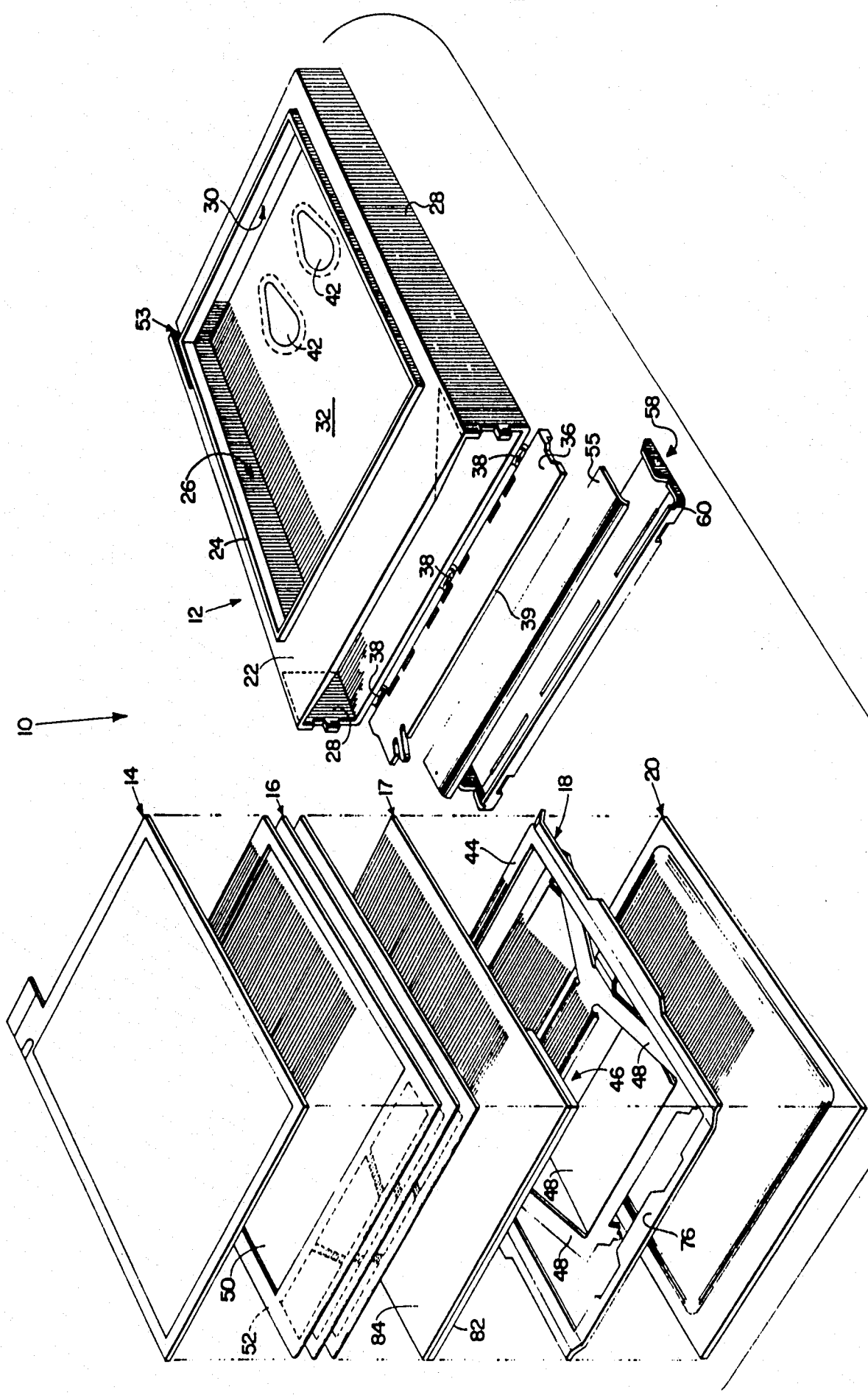

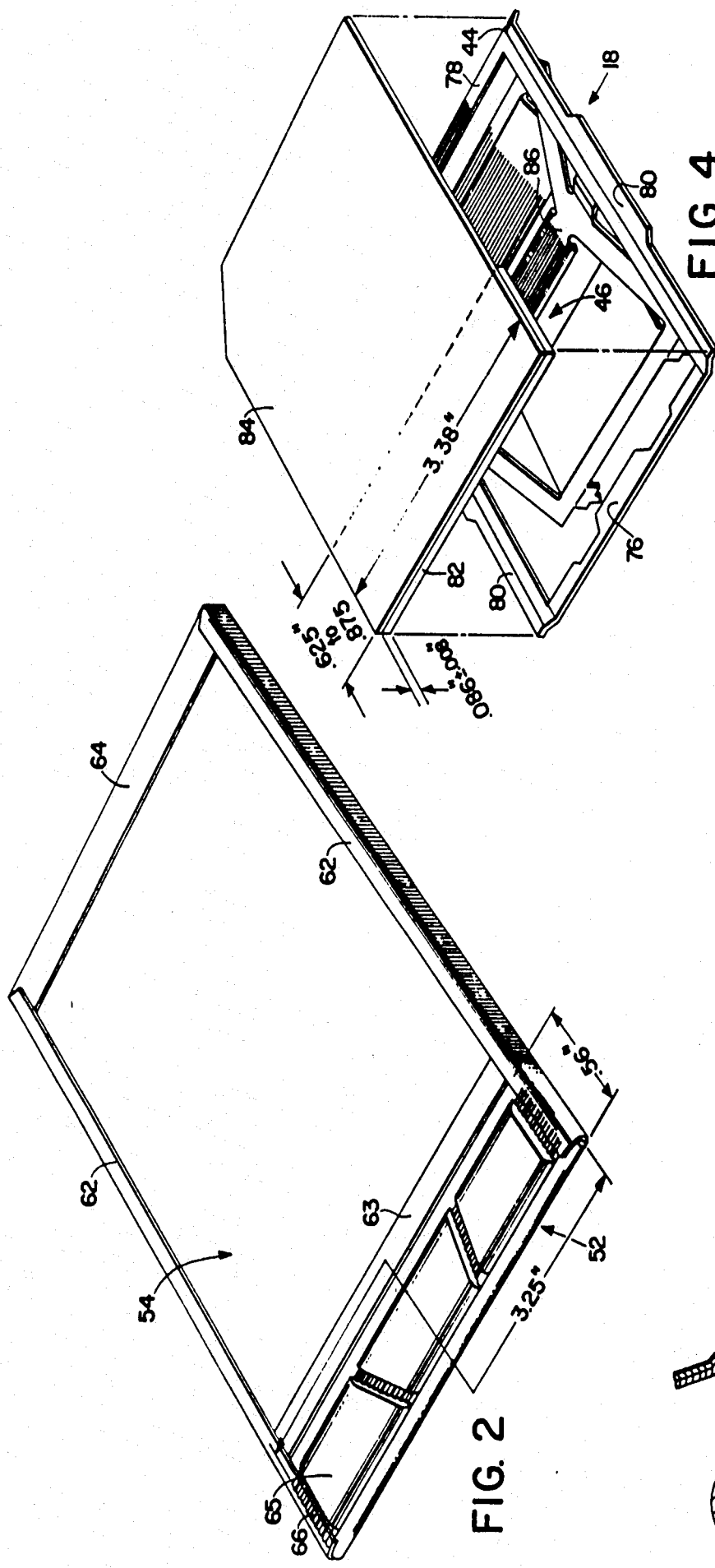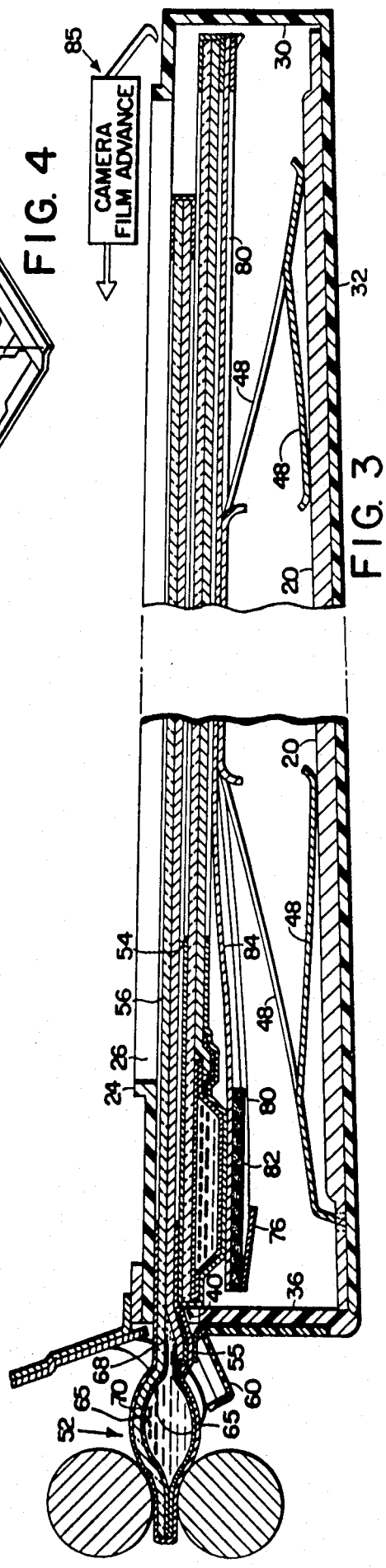

PHOTOGRAPHIC FILM ASSEMBLAGE WITH RESILIENT PAD UNDER PROCESSING SOLUTION CONTAINER

BACKGROUND OF THE INVENTION

1. Field of the Invention

The present invention relates to photography and, more particularly, to a photographic film assemblage including a film container holding at least one "self-developing" film unit.

2. Description of the Prior Art

U.S. Pat. Nos. 3,705,542; 3,543,663; 3,595,661; and 3,607,283 disclose photographic film assemblages comprising a film container having contents which generally include a dark slide for covering an exposure aperture in a forward wall of the container, a stack of individual self-developing film units positioned behind the dark slide, and a support member or spring biased platen for urging the stack of film units towards the forward wall to locate the forwardmost film unit in the stack in position for exposure through the exposure aperture subsequent to the removal of the dark slide. In a preferred embodiment, the assemblage also includes a battery for operating electrical mechanisms of a camera with which the assemblage is adapted to be used.

The film assemblage or pack is adapted to be inserted in an appropriate camera and the dark slide is removed through a withdrawal slot at one end of the container to uncover the exposure aperture, thereby moving the forwardmost film unit into position for exposure against the forward wall under the influence of the spring biased platen.

Subsequent to exposure, the forwardmost film unit is advanced, preferably by a mechanism in the camera, through the withdrawal slot into engagement with pressure-applying means in the camera adjacent the film withdrawal slot. Generally, these pressure-applying means take the form of a pair of juxtaposed, rotatably mounted, cylindrical rollers between which the exposed film unit is adapted to be advanced to initiate processing.

The self-developing film is preferably of the type disclosed in U.S. Pat. Nos. 3,415,644 and 3,647,437, issued to Edwin H. Land on Dec. 10, 1968, and Mar. 7, 1972, respectively. It comprises a plurality of layers including photosensitive and image-receiving layers. Within the film unit, and located at one end thereof, is a rupturable container holding a fluid, preferably a liquid, processing composition.

The film unit is adapted to be advanced, container of fluid first, between the pair of rollers which apply a compressive pressure to the container causing a seal to rupture and thereby discharging the fluid in a mass between a predetermined pair of layers. As the film unit is further advanced between the rollers, the mass of fluid is distributed in a thin uniform layer between the predetermined layers to cover the entire photoexposed area of the film unit and initiate a diffusion transfer process.

From the rollers, the film unit is advanced directly to the exterior of the camera. The film unit includes at least one transparent outer layer through which the photosensitive layer is exposed and/or the resultant positive image is viewed. In order to prevent further exposure of the photosensitive layer through this transparent layer when the film unit is outside of the camera, the liquid processing composition includes an opacification system which is effective to prevent further exposure of the photosensitive layer(s) by ambient actinic radiation.

A preferred opacification system for use in the processing fluid comprises a combination of light-absorbing dye(s) and a light-reflecting material or pigment, e.g., titanium dioxide. If the components of the opacification system are not distributed in a minimum coverage, e.g., if the coverage of the opacification system in given areas is insufficient to prevent further exposure of photosensitive material behind such localized areas, the resulting photographic image may then exhibit indistinct areas appearing visually similar to a blotch or a whitish veil. While the incidence of this defect is quite small, it is disturbing whenever it does occur.

SUMMARY OF THE INVENTION

The present invention provides a photographic film assemblage which includes means found effective to substantially reduce the incidence of the above discussed problem.

The film units are arranged in stacked relation within the film container with their respective stacked containers of fluid processing composition being located adjacent the end of the container having the film withdrawal slot therein.

In a preferred embodiment of the film assemblage, the container holds 10 film units. The stack of film units is urged towards the forward wall by a spring biased platen.

The platen preferably includes a flat, metal open rectangular frame formed by four integral frame members. The frame is supported by an integral spring member which bears against the battery and/or the bottom wall of the film container. The frame is dimensioned so that it would engage the periphery of the rearwardmost film unit in the stack with one end of the frame bearing or supporting the rupturable container of the rearwardmost film unit.

It has been found that by placing a piece of resilient material, e.g., a foam rubber or plastic pad, between the end of the frame and the rupturable container of fluid of the rearwardmost film unit and thereby preventing direct engagement between the film unit in the area of the container of fluid and the frame, the minimum opacification system coverage problem is substantially reduced.

In a preferred embodiment, the surface of the resilient pad adjacent the rearwardmost film unit container is covered with a low friction coating or a carrier sheet having a low friction surface or coating thereon. This coating or sheet is provided to facilitate sliding movement of the rearwardmost film unit over the resilient pad when the rearwardmost film unit is advanced through the withdrawal slot subsequent to exposure.

Therefore, it is an object of the invention to provide a photographic assemblage for locating at least one film unit, of the type including a container of fluid processing composition, at a predetermined location, said assemblage including means for urging the one film unit towards the predetermined location and resilient means for preventing direct contact of the urging means with the film unit in the area of the container of fluid.

It is another object of the invention to provide a photographic film assemblage comprising a film container including a forward wall and a film withdrawal slot at one end of the container; a plurality of film units, each including a container of fluid processing composition at one end thereof, said film units being arranged in stacked relation behind said forward wall with their respective containers of fluid adjacent the end of the film container having the withdrawal slot therein; means within the film container including a spring biased platen positioned behind the rearwardmost film unit in the stack for urging the stack of film units towards the forward wall; and a resilient pad positioned at one end of the spring biased platen between the platen and the container of fluid processing composition of the rearwardmost film unit to prevent direct engagement of the one end of the platen with the container of fluid of the rearwardmost film unit.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 1 is an exploded perspective view of a photographic film assemblage embodying the instant invention showing the construction and arrangement of various component parts of the assemblage;

FIG. 2 is a perspective view of the underside of a self-developing film unit forming part of the photographic film assemblage shown in FIG. 1;

FIG. 3 is a side elevational view, in section, of portions of the photographic film assemblage of FIG. 1 and a portion of a camera showing a film unit in operative association with a pair of pressure-applying rollers mounted in the camera; and FIG. 4 is a perspective view of a spring biased platen and a resilient pad mounted on a low friction cover sheet.

DESCRIPTION OF THE PREFERRED EMBODIMENT

The components of a photographic film assemblage 10 embodying the instant invention are shown in exploded fashion in FIG. 1 of the drawings. They include a box-like film container 12 and its contents, a dark slide 14, a plurality of self-developing film units 16, a resilient pad member 17, a film support member 18, and preferably an electrical battery 20.

Film container 12 is preferably molded of an opaque thermoplastic material, such as polystyrene, and includes relatively thin, substantially planar walls. A forward wall 22 includes a generally rectangular upstanding rib 24 which defines the bounds of a generally rectangular light-transmitting section or exposure aperture 26. Depending from three sides of forward wall 22, respectively, are a pair of side walls 28 and a trailing end wall 30 which serves to space a substantially planar rear wall 32 from forward wall 22.

The leading ends of forward wall 22, side walls 28, and rear wall 32 cooperated to define an elongated rectangular opening 34 at the leading end of container 12 through which the contents may be inserted. After insertion, a leading end wall 36 which is preferably coupled to the leading end of rear wall 32 by integrally formed flexible hinges 38, may be rotated 90° and joined to the leading ends of side walls 28 and rear wall 32 by any suitable method such as ultrasonic welding.

It will be noted that when leading end wall 36 is located in its closed position, its top edge 39 is spaced from the leading end of forward wall 22 such that an elongated withdrawal slot 40 is formed therebetween (see FIG. 3) through which dark slide 14 and film units 16 may be sequentially extracted from container 12.

The contents of film container 12 are preferably arranged therein in the stacked relation shown in FIG. 1. Battery 20 is substantially flat and is positioned over the interior surface of rear wall 32 such that two electrodes on the underside of the battery (not shown) are aligned with a pair of tear-drop shaped openings 42 in rear wall 32. When container 12 is operatively positioned in a suitable camera, a pair of electrical contacts mounted therein are adapted to extend through openings 42 for coupling battery 20 to the camera's electrical system which may include an automatic exposure control circuit, a flash mode circuit, and electrically driven film advance and processing mechanisms.

Positioned over battery 20 is the film support member or spring biased platen 18. Member 18 preferably includes a generally rectangular platen or open support frame 44 dimensioned to support the peripheral margins of the rearwardmost film unit 16 in the stack. Integrally formed with frame 44 is a generally H-shaped center section 46 which includes resilient spring legs 48 that bear against container rear wall 32 and/or battery 20 and urge platen 44 upwardly.

The resilient pad member 17 is located between frame 44 and the rearwardmost film unit 16. The spring biased platen 18 and resilient pad member 17 will be described in more detail later in the disclosure.

The film units 16 are substantially flat and preferably rectangular. They preferably include a rectangular or square photosensitive image-forming area 50, which is surrounded by opaque margins and a rupturable pod or container 52, containing a fluid processing composition, located at the leading end of the film unit outside of the bounds of the image-forming area 50. A more detailed discussion of the construction of film units 16 will appear hereinafter.

Dark slide 14 is formed of any suitable opaque material such as cardboard, paper, or plastic and is initially positioned between the forwardmost film unit 16 and the interior surface of forward wall 22. It serves to light seal exposure aperture 26 and opening 53. Once film container 12 is located at its operative position within a camera, it may be removed through withdrawal slot 40 in the same manner as the forwardmost film unit 16.

The film units 16 are arranged in stacked relation on top of resilient pad member 17 with their image-forming areas 50 facing towards the exposure aperture 26 in container forward wall 22 and their containers of fluid 52 adjacent end wall 36. Subsequent to the removal of dark slide 14, the forwardmost film unit 16 (closest to wall 22) bears against the interior surface of forward wall 22 and is in position for exposure to actinic radiation transmitted through exposure aperture 26.

It will be noted that after dark slide 14 is removed from container 12 through slot 40, the leading end of the forwardmost film unit 16, containing pod 52, is also aligned with withdrawal slot 40 at the leading end of container 12. Subsequent to exposure, the forwardmost film unit is adapted to be engaged by a film advancing mechanism 85 in the camera and moved out of container 12 through slot 40 in a direction substantially parallel to forward wall 22, for processing. Access for engaging the trailing end of the forwardmost film unit to move it forwardly through slot 40 is provided by an opening 53 located in forward wall 22 and the trailing end wall 30 of container 12 (see FIG. 1).

In order to light seal withdrawal slot 40, container 12 is preferably provided with an opaque flexible sheet 55 which is secured at one end to an exterior surface of leading end wall 36 and is disposed in closing relation to slot 40. This sheet forms a primary light seal for blocking light when container 12 is located within a camera. A secondary light shield for blocking slot 40 prior to inserting container 12 into the camera may also be provided in the form of an end cap member 58. Member 58 is coupled to leading end wall 36 and includes an end cap 60 which is initially positioned in closing relation to the primary light seal 55 and withdrawal slot 40 and may be pivoted to an open position in response to inserting container 12 into the camera. For details as to the construction and operation of end cap member 58, reference may be had to the copending application of Nicholas Gold, Ser. No. 213,989 (now U.S. Pat. No. 3,748,984), filed on Dec. 30, 1971, which is also assigned to the same assignee as the present invention.

Referring now to FIGS. 1, 2, and 3 of the drawings, a typical self-developing film unit 16 comprises a laminate represented by opposed or superposed sheet-like elements 54 and 56.

As disclosed in aforementioned U.S. Pat. Nos. 3,415,644 and 3,647,437, the substantially flat rectangular film unit 16 actually includes an opaque bottom outer support layer, a transparent top outer support layer and a plurality of superposed layers of photographic materials, including one or more photosensitive and an image-receiving layer, sandwiched between the two outer layers. The photosensitive layer or layers are adapted to be exposed by light transmitted through the transparent outer layer after which the processing fluid is distributed between a pair of predetermined adjacent layers to initiate a diffusion transfer process.

This laminate has been diagrammatically illustrated as including a top sheet-like element 56 (comprising a transparent outer sheet or layer and certain other layers thereon) and a bottom sheet-like element 54 (comprising an opaque bottom outer sheet or layer and certain other layers thereon). It will be understood that the interface between elements 54 and 56 represents an interface between a pair of predetermined layers within the laminate. The term "layer" will apply equally to an outer sheet and the layers between the outer sheets.

The laminate's structural integrity may also be enhanced or provided, in whole or in part, by providing a binding member 61 which extends around the edges of the laminate. The binding member 61 may take the form of an opaque, pressure-sensitive, adhesive tape which also serves to provide lateral margins 62, and leading and trailing end longitudinal margins 63 and 64, respectively, bordering the image-forming area 50.

The rupturable container 52 preferably comprises a rectangular blank of fluid impervious sheet material folded longitudinally upon itself to form two walls 65 which are sealed to one another along their lateral end margins 66 and longitudinal margin 68 to form a cavity in which a fluid processing composition 70 is retained. The longitudinal seal 68 is made weaker than the lateral end seals 66 so as to become unsealed in response to pressure generated within the fluid 70 by the application of compressive pressure to the walls 65 of the pod 52.

As best shown in FIG. 3, pod 52 is fixedly secured to the leading ends of the superposed sheet-like elements 54 and 56 such that the weaker longitudinal seal 68 is positioned to effect a unidirectional discharge of the fluid 70 between the predetermined pair of layers represented by the interface between sheet-like elements 54 and 56 upon application of compressive pressure to pod 52.

In use, film unit 16 is subjected to actinic radiation which is directed through exposure aperture 26 and the transparent outer sheet of element 56 to photoexpose the underlying photosensitive layer or layers. The film unit then may be advanced, container 52 first, through slot 40 and between a pair of juxtaposed cylindrical rollers 72 and 74 mounted in an appropriate camera (see FIG. 3) which apply a compressive pressure to the walls 65 of container 52 and induce a pressure in fluid 70 thereby causing seal 68 to rupture. The fluid 70 is discharged, in a mass, between elements 54 and 56, at leading end margin 63, and is spread between and in contact therewith in a thin layer towards margin 64 by rollers 72 and 74 as film unit 16 is further advanced between the rollers thereby covering the photoexposed area 50 with the fluid processing composition 70. Processing composition 70 initiates a diffusion transfer process that results in a transfer-image being formed which may be viewed through the outer transparent sheet of element 56.

For details of a camera that is suitable for use with film assemblage 10, reference may be had to the copending application of Alston, et al., Ser. No. 246,701, (now U.S. Pat. No. 3,779,984 Apr. 24, 1972.

As noted earlier, film unit 16 is adapted to be advanced through rollers 72 and 74 and then to the exterior of the camera. In order to prevent the ambient illumination outside of the camera from further exposing the photosensitive layer or layers through the transparent outer layer, the processing composition 70 includes an opacifying system. The components of such an opacification system are set forth in detail in U.S. Pat. Nos. 3,415,644 and 3,647,437.

A preferred opacification system for use in the processing fluid 70 comprises a combination of light-absorbing dye(s) and a light-reflecting material or pigment, e.g., titanium dioxide. If the components of the opacification system are not distributed between the predetermined layers of the film unit in a minimum coverage, e.g., if the coverage of the opacification system in given areas of the image-forming area 50 is insufficient to prevent further exposure of photosensitive material behind such localized areas, the resulting photographic image may then exhibit indistinct areas appearing visually similar to a blotch or whitish veil. While the incidence of this defect is quite small, it is disturbing whenever it does occur.

Experimentally, it has been determined that the minimum coverage problem can be substantially alleviated or eliminated by positioning the resilient pad member 17 between the rearwardmost film unit 16 (furthest from forward wall 22) and the platen or frame 44 to prevent direct engagement of frame 44 with the rearwardmost film unit 16 in the area of its container of fluid 52.

As best shown in FIG. 4, the spring biased platen 18 is preferably formed from a single piece of thin resilient metal sheet, e.g., steel, by stamping. The open frame or platen 44 is formed by four integral frame members, a leading end frame member 76, a trailing end frame member 78, and a pair of side frame members 80.

The resilient pad member 17 preferably comprises a generally rectangular, parallelepiped shaped, resilient pad 82 and an overlying cover sheet 84.

Resilient pad 82 is compressible and is adapted to be positioned on the leading end of frame 44 in underlying relationship to the container of fluid 52 of the rearwardmost film unit 16 in the stack. The cover sheet 84, over pad 82, serves to provide a low friction surface to facilitate the sliding motion of the rearwardmost film unit 16 over resilient pad 82 when the rearwardmost film unit is advanced through withdrawal slot 40.

The term "low friction" is used in the relative sense meaning that the coefficient of friction of the top surface of cover sheet 84 is lower than the coefficient of friction of material forming resilient pad 82.

In a preferred embodiment, pad 82 is formed of an open cell foam material such as foam rubber or a suitable synthetic substitute such as polyurethane foam.

One resilient material that has been found to perform satisfactorily is a polyurethane foam manufactured by the Scott Paper Company, Foam Division, Chester, Pa. Designated "Scott Industrial Foam," it is a 97 percent open cell structure (fully reticulated) having 80 pores per inch and weighing 1.5 pounds per cubic foot.

Dimensionally, the pad 82 is substantially coextensive with and preferably larger in area than the container of fluid 52. A typical container of fluid measures approximately 3.25 inches across its long or lateral dimension and 0.56 inch along its short or longitudinal dimension (see FIG. 2). The corresponding dimensions of a typical pad 82 approximate 3.38 × 0.625 to 0.875 inch (see FIG. 4). The thickness of pad 82 is approximately 0.086 ± 0.008 inch.

As best shown in FIG. 3, resiliently compressible pad 82 is positioned over the leading end of frame member 76 and portions of side frame member 80 so that it underlies container 52 (with cover sheet 84 therebetween). The spring biased platen 18 is also compressible. However, the force needed to compress member 18 is greater than that required to compress pad 82.

The cover sheet 84 is generally dimensioned to be coextensive with frame or platen 44 except for cut off triangular section at the left trailing end corner (as viewed in FIG. 4). As noted earlier, a film advancing mechanism 85 in the camera is adapted to extend through opening 53 in the left trailing end corner of film container 12 (as viewed in FIG. 1) to engage the trailing end of the forwardmost film unit and advance or slide it through withdrawal slot 40. That portion of cover sheet 84 in alignment with opening 53 is preferably cut off to preclude any interference between the film advance mechanism 85 and the cover sheet 84 when the advancing mechanism engages the last film unit in the container 12.

Cover sheet 84 is preferably formed of a thin material such as photographic grade paper or plastic having a low friction exterior surface facing the rearwardmost film unit 16 in the stack. One suitable material is 45 lb. stock Regal black paper, 0.0026 inch thick, manufactured by the Regal Products Co., Milford, N.J.

The resilient pad 82 is preferably heat sealed (using any suitable heat sealing agent) to the leading end of cover sheet 84. The cover sheet 84 is then preferably heat sealed (again using any suitable heat sealing agent) to a cross member 86 forming part of the H-shaped spring member 46 of spring biased platen 18. It will be apparent to one skilled in the art that methods (e.g., adhesive bonding) other than heat sealing may be used to bond pad 82 to cover sheet 84 and cover sheet 84 to the spring biased platen 18.

The beneficial effect of resilient pad member 17, i.e., a substantial reduction in the incidence of the minimum coverage problem, seems to come entirely from the resilient pad 82. The cover sheet 84 merely provides a low friction surface to enhance sliding of the film unit 16.

At this point it should be pointed out that the dimensions and type of foam used for resilient pad 82 have been included to illustrate one embodiment of the invention that is useful for one particular film unit. Suitable resilient pads for other film units may be readily determined by routine testing to match the pad with the particular characteristics, e.g., fluid viscosity, etc., of the film unit and/or the way in which it is handled during manufacture.

While resilient pad member 17 is shown to include a cover sheet 84 covering most of frame 44, it will be understood that a full cover sheet is not essential. It is within the scope of the present invention to use a resilient pad 82 having a low friction coating or cover sheet only on its top surface facing the container of fluid 52 of the rearwardmost film unit.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. Photographic assemblage for locating at least one film unit in a predetermined location, the one film unit comprising a plurality of layers, including photosensitive and image-receiving layers, and a container of fluid processing composition at one end of the film unit, the fluid being adapted to be distributed between a predetermined pair of layers, said assemblage comprising:
   means for urging the one film unit towards the predetermined location, said urging means being positioned so that the one film unit is intermediate the predetermined location and said urging means; and
   resilient means positioned between the one film unit and said urging means for preventing direct engagement of said urging means with the one film unit in the area of the container of fluid.

2. Photograpic assemblage as defined in claim 1 wherein the one film unit is adapted to be advanced relative to said resilient means and said assemblage further includes means defining a low friction surface between said resilient means and the one film unit to facilitate advancement of the one film unit over the resilient means, said low friction surface having a coefficient of friction lower than the coefficient of friction of said resilient means.

3. Photographic assemblage as defined in claim 1 wherein a plurality of film units arranged in stacked relationship are adapted to be located between the predetermined location and said urging means with a forwardmost film unit in the stack being closest to the predetermined location and a rearwardmost film unit in the stack being furthest from the predetermined location, the stack of film units being intermediate the predetermined location and said urging means and said resilient means being positioned between said urging means and the rearwardmost film unit for preventing direct engagement of said urging means with the rearwardmost film unit in the area of its container of fluid.

4. A photographic film assemblage comprising:
a film container for holding at least one film unit, said film container including a forward wall;
at least one film unit in said film container, said film unit comprising a plurality of layers, including photosensitive and image-receiving layers, and a container of fluid processing composition at one end of said film unit, said fluid being adapted to be distributed between a predetermined pair of layers;
means within said film container for urging said one film unit towards said forward wall; and
resilient means positioned between said urging means and said one film for preventing direct enagement of said urging means with said one film unit in the area of said container of fluid.

5. A photographic film assemblage as defined in claim 4 wherein said container of fluid is of given dimensions and said resilient means is dimensioned to be substantially coextensive with said container of fluid.

6. A photographic film assemblage as defined in claim 4 wherein said film container further includes an end wall having a withdrawal slot therein through which said one film unit is adapted to be advanced and said assemblage further includes means defining a surface between said resilient means and said one film unit in the area of said container of fluid, said surface having a lower coefficient of friction than said resilient means to facilitate advancement of said one film unit over said resilient means and through said withdrawal slot.

7. A photographic film assemblage as defined in claim 4 wherein there are a plurality of said film units arranged in stacked relationship within said film container between said forward wall and said urging means with a forwardmost film unit in said stack being closest to said forward wall of said film container and a rearwardmost film unit in said stack being furthest from said forward wall, said resilient means being positioned between said rearwardmost film unit and said urging means to prevent direct engagement of said urging means with said rearwardmost film unit in the area of its said container of fluid.

8. A photographic film assemblage as defined in claim 7 wherein said film container further includes a rear wall spaced from said forward wall and a light transmission section in said forward wall and said assemblage further includes an electrical battery positioned between said rear wall and said urging means, and a dark slide positioned between said forward wall and said forwardmost film unit for blocking light passing through said light transmission section and thereby preventing exposure of said forwardmost film unit.

9. A photographic film assemblage as defined in claim 4 wherein said resilient means is compressible in response to a first given force being applied thereto and said urging means is compressible in response to a second given force being applied thereto, said second given force being greater than said first given force 10. A photographic film assemblage comprising:
a film container for holding a plurality of film units, said container including a forward wall and an end wall having a film withdrawal slot therein;
a plurality of film units arranged in stacked relationship within said film container with a forwardmost film unit in said stack being closest to said forward wall and a rearwardmost film unit in said stack being furthest from said forward wall, each of said plurality of film units comprising a plurality of layers, including photosensitive and image-receiving layers, and a container of fluid processing composition at one end of said each film unit, said fluid being adapted to be distributed between a predetermined pair of said layers, said plurality of film units being arranged in said stack with said containers of fluid being adjacent said end wall of said film container;
means located behind said rearwardmost film unit for urging said stack of film units towards said forward wall, said urging means including a portion thereof located in underlying relationship to said container of fluid of said rearwardmost film unit; and
resilient means positioned between said portion of said urging means and said rearwardmost film unit in said stack for preventing direct engagement of said portion of said urging means with said rearwardmost film unit in the area of its said container of fluid.

11. A photographic film assemblage as defined in claim 10 wherein said forwardmost film unit in said stack is adapted to be advanced through said withdrawal slot, and said assemblage further includes means defining a low friction surface between said resilient means and said rearwardmost film unit to facilitate the advancement of said rearwardmost film unit over said resilient means when said rearwardmost film unit is advanced through said withdrawal slot, said low friction surface having a coefficient of friction lower than the coefficient of friction of said resilient means.

12. A photographic film assemblage as defined in claim 10 wherein said film units are substantially flat and rectangular and said urging means includes a spring biased rectangular platen dimensioned to apply an urging force to the peripheral margins of said rearwardmost film unit, said portion of said urging means including a portion of said platen underlying said container of fluid of said rearwardmost film unit.

13. Photographic assemblage for locating at least one film unit in a predetermined location, the one film unit comprising a plurality of layers, including photosensitive and image-receiving layers, and a container of fluid processing composition at one end of the film unit, the fluid being adapted to be distributed between a predetermined pair of layers, said assemblage comprising:
means for urging the one film unit towards the predetermined location, said urging means being positioned so that the one film unit is intermediate the predetermined location and said urging means; and
a resiliently compressible pad positioned between the one film unit and said urging means in alignment with the film unit container of fluid for preventing direct engagement of said urging means with the one film unit in the area of the container of fluid.

14. Photographic assemblage as defined in claim 13 wherein said resiliently compressible pad is formed of a polyurethane foam material.

15. A photographic film assemblage comprising:
a film container for holding at least one film unit, said film container including a forward wall;
at least one film unit in said film container, said film unit comprising a plurality of layers, including photosensitive and image-receiving layers, and a container of fluid processing composition at one end of said film unit, said fluid being adapted to be distributed between a predetermined pair of layers,
means within said film container for urging said one film unit towards said forward wall; and
a resilient pad formed of a polyurethane foam positioned between said urging means and said one film unit for preventing direct engagement of said urging means with said one film unit in the area of said container of fluid.

16. A photographic film assemblage as defined in claim 15 wherein said polyurethane foam is a 97 percent open cell structure having 80 pores per inch and weighing approximately 1.5 lbs. per cubic foot.

17. A photographic film assemblage comprising:
a film container for holding a plurality of film units, said container including a forward wall and an end wall having a film withdrawal slot therein;
a plurality of substantially flat and rectangular film units arranged in stacked relationship within said film container with a forwardmost film unit in said stack being closest to said forward wall and a rearwardmost film unit in said stack being furthest from said forward wall, each of said plurality of film units comprising a plurality of layers, including photosensitive and image-receiving layers, and a container of fluid processing composition at one end of said each film unit, said fluid being adapted to be distributed between a predetermined pair of said layers, said plurality of film units being arranged in said stack with said containers of fluid being adjacent said end wall of said film container;
means located behind said rearwardmost film unit for urging said stack of film units toward said forward wall, said urging means including a spring biased rectangular platen dimensioned to apply an urging force to the peripheral margins of said rearwardmost film unit, said platen including a portion thereof underlying said container of fluid of said rearwardmost film unit; and
a resilient polyurethane foam pad positioned on said portion of said platen in underlying relation to said container of fluid of said rearwardmost film unit for preventing direct engagement of said portion of said platen with said rearwardmost film unit in the area of its said container of fluid, said pad being dimensioned so as to be substantially coextensive with said container of fluid of said rearwardmost film unit.

18. A photographic film assemblage as defined in claim 17 further including a low friction cover sheet positioned over said platen and said resilient pad, said cover sheet including a surface, facing said rearwardmost film unit, having a coefficient of friction which is lower than the coefficient of friction of said polyurethane foam resilient pad.

19. A photographic film assemblage as defined in claim 18 wherein said film container includes an opening therein for receiving externally mounted means for engaging and advancing said forwardmost film unit through said withdrawal slot and said cover sheet includes a cut-out portion located in underlying relationship to said opening to prevent any interference between said cover sheet and the externally mounted film advancing means when said rearwardmost film unit is located in position for advancement through said withdrawal slot.

20. A photographic film assemblage as defined in claim 17 wherein said resilient pad is parallelepiped shaped and has a thickness dimension, measured between said portion of said platen and said container of fluid of said rearwardmost film unit, of approximately 0.086 inch.

21. A photographic film assemblage as defined in claim 20 wherein said resilient pad is formed of a 97 percent open-celled polyurethane foam having 80 pores per inch and weighing approximately 1.5 lbs. per cubic foot.

* * * * *